United States Patent
Eisenschlos et al.

(10) Patent No.: US 12,547,848 B2
(45) Date of Patent: Feb. 10, 2026

(54) ONE-SHOT VISUAL LANGUAGE REASONING OVER GRAPHICAL DEPICTIONS OF DATA

(71) Applicant: Google LLC, Mountain View, CA (US)

(72) Inventors: Julian Martin Eisenschlos, Zürich (CH); Francesco Piccinno, Zürich (CH); Yasemin Altun, Zürich (CH); Syrine Krichene, Zürich (CH); Kenton Chiu Tsun Lee, Kirkland, WA (US); Fangyu Liu, Cambridge (GB); Mandar Joshi, Seattle, WA (US); Chenxi Pang, Zürich (CH); Wenhu Chen, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 336 days.

(21) Appl. No.: 18/319,249

(22) Filed: May 17, 2023

(65) Prior Publication Data
US 2024/0386215 A1   Nov. 21, 2024

(51) Int. Cl.
*G06T 11/20* (2006.01)
*G06F 40/40* (2020.01)
*G06N 20/00* (2019.01)

(52) U.S. Cl.
CPC ............ *G06F 40/40* (2020.01); *G06T 11/206* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2012/0213429 A1* | 8/2012 | Vasudevan | G06V 30/422 382/176 |
| 2022/0188564 A1* | 6/2022 | Gudimetla | G06F 18/2178 |
| 2024/0320421 A1* | 9/2024 | Bursztyn | G06F 40/56 |
| 2024/0362405 A1* | 10/2024 | Sultanum | G06F 40/166 |
| 2024/0386058 A1* | 11/2024 | Thomas | G06F 40/103 |

OTHER PUBLICATIONS

Masry et al., "ChartQA: A Benchmark for Question Answering about Charts with Visual and Logical Reasoning", Mar. 19, 2022, ACL 22. (Year: 2022).*

(Continued)

*Primary Examiner* — Nafiz E Hoque
(74) *Attorney, Agent, or Firm* — DORITY & MANNING P.A.

(57) ABSTRACT

Provided is a one-shot solution to visual language reasoning. Example systems described herein decompose the challenge of visual language reasoning into two steps: translation of a graphical depiction of data (e.g., a plot or chart) into text; followed by reasoning over the translated text. In particular, example systems described herein can include a machine-learned visual-to-language conversion model that translates a graphical depiction of a dataset to a set of text descriptive of the dataset. The output of visual-to-language conversion model can then be directly used to prompt a language model, (e.g., a pretrained large language model (LLM)), exploiting the few-shot reasoning capabilities of the language model.

19 Claims, 9 Drawing Sheets

(56) References Cited

OTHER PUBLICATIONS

Akhtar et al., "Reading and Reasoning Over Chart Images for Evidence-Based Automated Fact-Checking.", arXiv:2301.11843v1, Jan. 27, 2023.
Andrejczuk et al., "Table-to-Text Generation and Pre-Training with TabT5.", arXiv:2210.09162v1, Oct. 17, 2022, 9 pages.
Biten et al., "ICDAR 2019 Competition on Scene Text Visual Question Answering", arXiv:1907.00490v1, Jun. 30, 2019, 8 pages.
Brown et al., "Language Models are Few-Shot Learners.", arXiv:2005.14165v4, Jul. 22, 2020, 75 pages.
Chen et al., "Evaluating Large Language Models Trained on Code.", arXiv:2107.03374v2, Jul. 14, 2021, 35 pages.
Chen et al., "PaLI: A Jointly-Scaled Multilingual Language-Image Model.", arXiv:2209.06794v4, Jun. 5, 2023, 33 pages.
Chen et al., "Program of Thoughts Prompting: Disentangling Computation from Reasoning for Numerical Reasoning Tasks.", arXiv:2211.12588v3, Nov. 29, 2022, 11 pages.
Chen., "Large Language Models are few (1)-shot Table Reasoners.", arXiv:2210.06710v2, Jan. 23, 2023, 11 pages.
Cheng et al., "Binding Language Models in Symbolic Languages.", arXiv:2210.02875v2, Mar. 1, 2023, 27 pages.
Cho et al., "Unifying Vision-and-Language Tasks via Text Generation.", arXiv:2102.02779v2, May 23, 2021, 15 pages.
Chowdhery et al., "PaLM: Scaling Language Modeling with Pathways.", arXiv:2204.02311v5, Oct. 5, 2022, 87 pages.
Chung et al., "Scaling Instruction-Finetuned Language Models.", arXiv:2210.11416v5, Dec. 6, 2022, 54 pages.
Dosovitskiy et al., "An Image is Worth 16×16 Words: Transformers for Image Recognition at Scale.", arXiv:2010.11929v2, Jun. 3, 2021, 22 pages.
Gao et al., "PAL: Program-aided Language Models.", arXiv:2211.10435v2, Jan. 27, 2023.
Gehrmann et al., "TaTa: A Multilingual Table-to-Text Dataset for African Languages.", arXiv:2211.00142v1, Oct. 31, 2022, 24 pages.
Herzig et al., "TAPAS: Weakly Supervised Table Parsing via Pre-training.", arXiv:2004.02349v2, Apr. 21, 2020, 14 pages.
Kantharaj et al., "Chart-to-Text: A Large-Scale Benchmark for Chart Summarization." arXiv:2203.06486v3, Apr. 14, 2022, 19 pages.
Kato et al., "Parsing Line Chart Images Using Linear Programming.", 2022 IEEE/CVF Winter Conference on Applications of Computer Vision (WACV), Waikoloa, Hawaii, United States, Jan. 4-8, 2022, pp. 2553-2562.
Lee et al., "Pix2Struct: Screenshot Parsing as Pretraining for Visual Language Understanding.", arXiv:2210.03347v2, Jun. 15, 2023, 20 pages.
Levy et al., "Classification-Regression for Chart Comprehension.", arXiv:2111.14792v2, Jul. 11, 2022, 27 pages.
Liu et al., "DEPLOT: One-shot Visual Language Reasoning by Plot-to-Table Translation.", arXiv:2212.10505v2, May 23, 2023, 17 pages.
Liu et al., "MatCha: Enhancing Visual Language Pretraining with Math Reasoning and Chart Derendering.", arXiv:2212.09662v2, May 23, 2023, 13 pages.
Liu et al., "Mind's eye: Grounded Language Model Reasoning through Simulation.", arXiv:2210.05359v1, Oct. 11, 2022, 18 pages.
Luo et al., "ChartOCR: Data Extraction from Charts Images via a Deep Hybrid Framework.", 2021 Institute of Electrical and Electronics Engineers Winter Conference on Applications of Computer Vision (WACV), Virtual, Jan. 5-9, 2021, pp. 1917-1928.
Masry et al., "ChartQA: A Benchmark for Question Answering about Charts with Visual and Logical Reasoning.", arXiv:2203.10244v1, Mar. 19, 2022, 17 pages.
Methani et al., "PlotQA: Reasoning over Scientific Plots.", arXiv:1909.00997v3, Feb. 1, 2020, 18 pages.
OpenAI, "GPT-4 Technical Report.", arXiv:2303.08774v3, Mar. 27, 2023, 100 pages.
Radford et al., "Learning Transferable Visual Models from Natural Language Supervision.", arXiv:2103.00020v1, Feb. 26, 2021, 48 pages.
Raffel et al., "Exploring the Limits of Transfer Learning with a Unified Text-to-Text Transformer.", arXiv:1910.10683v4, Sep. 19, 2023, 67 pages.
Rane et al., "ChartReader: Automatic Parsing of Bar-Plots.", 2021 Institute of Electrical and Electronics Engineers 22nd International Conference on Information Reuse and Integration for Data Science (IRI), Las Vegas, Nevada, United States, Aug. 10-12, 2021, pp. 318-325.
Siegel et al., "FigureSeer: Parsing Result-Figures in Research Papers.", Fourteenth European Conference, Amsterdam, The Netherlands, Oct. 11-14, 2016, pp. 664-680.
Su et al., "Language Models Can See: Plugging Visual Controls in Text Generation.", arXiv:2205.02655v2, May 30, 2022, 21 pages.
Wang et al., "Self-Consistency Improves Chain of Thought Reasoning in Language Models.", arXiv:2203.11171v4, Mar. 7, 2023, 24 pages.
Wei et al., "Chain-of-Thought Prompting Elicits Reasoning in Large Language Models.", arXiv:2201.11903v6, Jan. 10, 2023, 43 pages.
Yang et al., "An Empirical Study of GPT-3 for Few-Shot Knowledge-Based VQA.", arXiv:2109.05014v2, Sep. 14, 2022, 10 pages.
Yin et al., "TaBERT: Pretraining for Joint Understanding of Textual and Tabular Data.", arXiv:2005.08314v1, May 17, 2020, 15 pages.
Zeng et al., "Socratic Models: Composing Zero-Shot Multimodal Reasoning with Language.", arXiv:2204.00598v2, May 27, 2022, 30 pages.

\* cited by examiner

ONE-SHOT VISUAL LANGUAGE REASONING OVER GRAPHICAL DEPICTIONS OF DATA

FIELD

The present disclosure relates generally to machine learning for visual language reasoning. More particularly, the present disclosure relates to computerized systems and methods for processing graphical data using visual-to-language and language models to generate a textual output.

BACKGROUND

Visual language refers to the use of text and visual elements together to convey meaning, which is commonly seen in charts, plots, diagrams, and other mediums such as textbooks, scientific papers, and web pages. However, it is highly complex, as it involves recognizing patterns from various structural units, including lines, shapes, colors, orientations, scales, angles, and spaces, and performing spatial grouping and alignment to extract information for reasoning.

Thus, multimodal reasoning on visual language, such as plots and charts, is an intricate task. Attempts to perform multimodal reasoning with machine learning models requires such models to extract relevant information from images and organize it sensibly before performing reasoning over the extracted entries, which is essential for downstream tasks like question answering (QA) on plots/charts.

Due to the high complexity of jointly modeling language and symbols, vision-language models that have pretrained on natural images or image-text pairs crawled from the web typically perform poorly on certain visual language tasks or benchmarks. Furthermore, prior state-of-the-art (SOTA) models require at least tens of thousands of training examples, Even then, their reasoning capabilities are still significantly limited, especially when applied to complex humanly-written queries.

In particular, previous studies have proposed end-to-end solutions to such visual language tasks. While these studies represent a somewhat effective solution, end-to-end methods need to be finetuned on large amounts of task data. This finetuning process is computationally expensive, requiring significant amounts of computational resources such as processor cycles, memory usage, and/or network bandwidth. Furthermore, even after lengthy finetuning, end-to-end solutions still demonstrate relatively poor performance on queries that require complex reasoning.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to process graphical depictions of data. The method includes obtaining, by a computing system comprising one or more computing devices, an input comprising a graphical depiction of a dataset. The method includes processing, by the computing system, the graphical depiction of the dataset with a machine-learned visual-to-language conversion model to generate, as an output of the machine-learned visual-to-language conversion model a set of text descriptive of the dataset. The method includes processing, by the computing system, the set of text descriptive of the dataset with a machine-learned language model to generate, as an output of the machine-learned language model, a textual output. The method includes providing, by the computing system, the textual output as an output.

Another example aspect of the present disclosure is directed to a computing system configured to process graphical depictions of data. The computing system includes one or more processors and one or more non-transitory computer-readable media that collectively store: a machine-learned visual-to-language conversion model configured to convert graphical depictions of data to textual descriptions; a machine-learned language model configured to process textual input to generate textual output; and instructions that, when executed by the computing system, cause the computing system to perform operations. The operations include obtaining, by the computing system, an input comprising a graphical depiction of a dataset. The operations include processing, by the computing system, the graphical depiction of the dataset with a machine-learned visual-to-language conversion model to generate, as an output of the machine-learned visual-to-language conversion model a set of text descriptive of the dataset. The operations include processing, by the computing system, the set of text descriptive of the dataset with a machine-learned language model to generate, as an output of the machine-learned language model, a textual output.

Another example aspect of the present disclosure is directed to one or more non-transitory computer-readable media that collectively store instructions that, when executed by a computing system, cause the computing system to perform operations. The operations include obtaining a visual-to-language conversion model. The operations include pre-training the visual-to-language conversion model one or more pre-training tasks. The operations include, after said pre-training, fine-tuning the visual-to-language conversion model on a fine-tuning task, wherein the fine-tuning task comprises converting a graphical depiction of a dataset to a textual description of the dataset. The operations include, after said fine-tuning, deploying the visual-to-language conversion model in combination with a machine-learned language model to perform processing of graphical depictions of data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
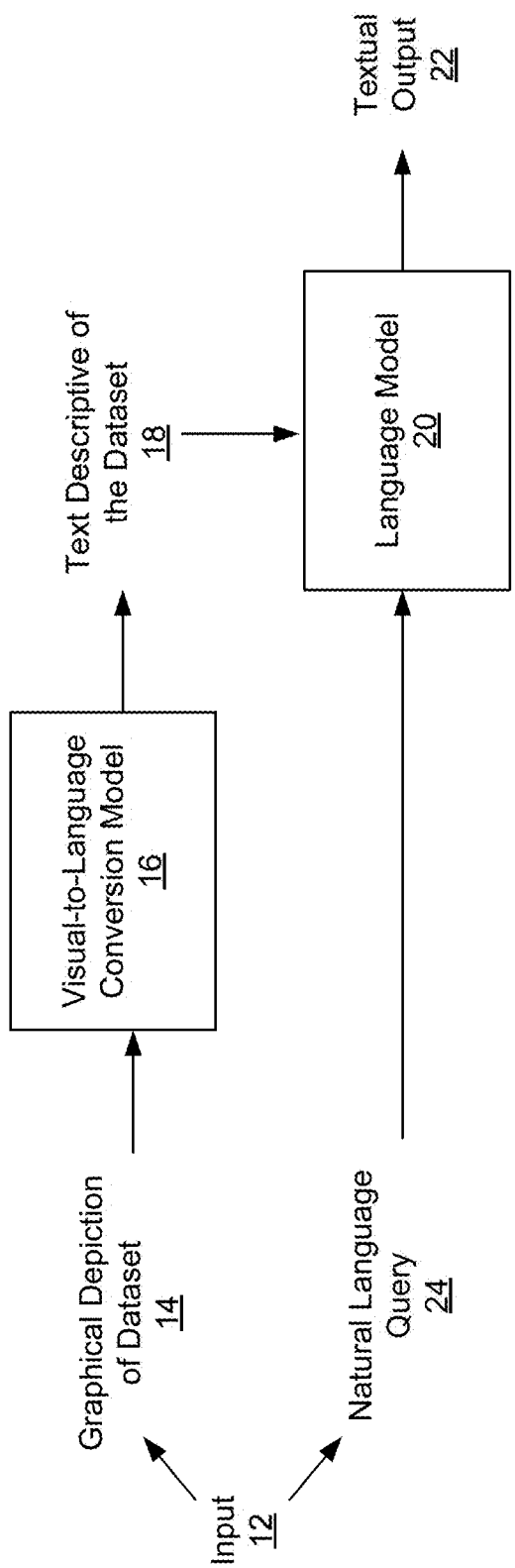
FIG. 1 depicts a block diagram of an example framework for performing visual language reasoning according to example embodiments of the present disclosure.

Reference numerals that are repeated across plural figures are intended to identify the same features in various implementations.

DETAILED DESCRIPTION

Overview

Generally, the present disclosure is directed to a one-shot solution to visual language reasoning. Example systems described herein decompose the challenge of visual language reasoning into two steps: translation of a graphical depiction of data (e.g., a plot or chart) into text; followed by reasoning over the translated text. In particular, example systems described herein can include a machine-learned visual-to-language conversion model that translates a graphical depiction of a dataset to a set of text descriptive of the dataset. The output of visual-to-language conversion model can then be directly used to prompt a language model, (e.g., a pretrained large language model (LLM)), exploiting the few-shot reasoning capabilities of the language model.

The present disclosure also includes training techniques for the visual-to-language conversion model, such as pre-training tasks that cover plot deconstruction and numerical reasoning, which are essential capabilities in visual language modeling. Additionally, the plot-to-table task is standardized by establishing uniform task formats and metrics, allowing for end-to-end training of the visual-to-language conversion model on this task. Once trained, the model can be readily used with a pretrained language model (e.g., LLM) in a plug-and-play fashion.

More particularly, the present disclosure introduces a visual-to-language conversion model—example implementations of which can be referred to as "DePlot"—that converts graphical representations of data (e.g., charts and plots) into a textual description of the underlying data (e.g., a textual representation of the data table). Previous chart information extraction methods have been hybrid systems that combine multiple modules and rely on complex hand-designed rules, OCR, keypoint detection, and object segmentation. These methods use different approaches for different types of charts and do not have a consistent framework for evaluation, with some using metrics specific to certain chart types or overly-simplified number matching metrics.

In some implementations, the visual-to-language conversion model can be implemented as an end-to-end image-to-text Transformer model. The model can be trained with the task of plot-to-table translation. As an example, a combination of synthetic and web-crawled charts and plots and their underlying data table can be collected and used as the training corpus. Once trained, the visual-to-language conversion model can significantly outperform hybrid systems and can uniformly handle all types of charts. In addition, to accurately capture plot-to-table systems' effectiveness (and avoid error propagation to downstream tasks), a novel table matching metric is provided that looks at both textual and numeric entries with relative error tolerance, and is invariant to transpositions and row and column permutations.

Once the visual-to-language conversion model has successfully translated graphical images into text, like linearized tables, the output from the visual-to-language conversion model can be provided alongside a query (e.g., a question or instruction) to a language model (e.g., a LLM) to generate a response from the language model. To ensure that the language model provides the most accurate answers possible, some example implementations can utilize innovative prompting techniques such as Chain of Thought (CoT) and Self-Consistency (SC).

Further example aspects of the present disclosure are directed to techniques to perform math reasoning and/or chart de-rendering pretraining to enhance the capability of the visual-to-language conversion model to jointly model graphical depictions of data (e.g., charts and/or plots) and language data. Specifically, several pretraining tasks are proposed that cover plot deconstruction and numerical reasoning which are the key capabilities in visual language modeling.

In particular, visual language understanding requires two essential components: layout understanding, which includes extracting and organizing numbers in a logical form, and mathematical reasoning, which involves operating on these extracted elements to derive meaningful information based on the task or query at hand. To enhance visual language understanding, the present disclosure proposes two pretraining tasks that complement each other: chart derendering and math reasoning.

Chart derendering involves generating the underlying data table or the code used to create a plot or chart. In this task, the image-to-text model is given a plot or chart as input and is required to produce its corresponding data table or code. The second pretraining task is math reasoning, which involves rendering text-based numerical reasoning inputs as images and decoding the answers using an image-to-text model. Two numerical reasoning datasets, MATH and DROP, can be used for this task.

The effectiveness of the trained model can be tested using a suite of visual language tasks. Some example testing datasets include ChartQA and PlotQA, which are QA datasets about plots and charts. The trained model can also be evaluated using chart-to-text summarization tasks. Additionally, to examine if the model pretraining generalizes to datasets beyond the standard plots and charts domain, the trained model can be tested on other domains such as, for example: documents, illustrations, user interfaces, and natural images. Example experiments conducted using these tasks consistently found that the implementations of the present disclosure demonstrated improvement on most datasets as compared with certain baselines.

The present disclosure provides a number of technical effects and benefits. As one example, the visual-to-language conversion model and associated framework involves technical means such as machine learning algorithms, image processing techniques, and natural language processing (NLP) models to solve technical problems related to information extraction and reasoning from graphical data. The proposed visual-to-language conversion model is designed to convert graphical depictions of a dataset to a textual description of the dataset. This process involves the use of machine learning algorithms and computer vision techniques to extract relevant information from the image and organize it in a sensible manner. The model can be trained using specific pre-training tasks that cover plot deconstruction and numerical reasoning, and training and performance measures can be standardized through the establishment of unified task formats and metrics.

One example technical effect of the proposed approach is to provide a solution to a complex problem in the field of visual language reasoning. By enabling the conversion of visual information to textual descriptions, the proposed models can be used in downstream tasks such as question answering on charts and plots, without the need for complex hand-designed rules, OCR, keypoint detection, and object segmentation modules. Additionally, the model's few-shot reasoning capabilities enable it to reason over the extracted entries with a high degree of accuracy and precision, which is a significant improvement over prior state-of-the-art models.

As another example technical effect, the proposed approach of using a visual-to-language conversion model for visual language reasoning can improve the computational efficiency of a computer in several ways. First, by converting visual data into text data, the model reduces the amount of data that needs to be processed and analyzed. Textual data can be more efficiently processed using natural language processing techniques, which can result in faster and more accurate analysis as compared to processing raw visual data.

Additionally, the use of a pretrained large language model (LLM) can also improve computational efficiency. General-purpose LLMs are trained on large amounts of textual data, and can therefore provide a fast and accurate response to natural language queries. This avoids the need for time-consuming and computationally expensive training of bespoke models from scratch.

With reference now to the Figures, example embodiments of the present disclosure will be discussed in further detail.

Example One-Shot Visual Language Reasoning Framework

FIG. 1 shows an block diagram of an example framework for processing graphical depictions of data. The illustrated framework can be implemented by a computing system. Specifically, the computing system can obtain an input 12 that includes a graphical depiction of a dataset 14.

Once the input 12 is obtained, the graphical depiction of the dataset 14 is processed using a machine-learned visual-to-language conversion model 16. This processing generates a set of text descriptive of the dataset 18. In other words, the visual information contained in the graphical depiction 14 is converted into the textual representation 18.

Next, the set of text descriptive of the dataset 18 is processed using a machine-learned language model 20. This processing generates a textual output 22. The textual output 22 can contain additional information derived from or descriptive of the dataset that was not explicitly present in the graphical depiction 14. The language model 20 is capable of understanding the context and relationships between the various pieces of information in the dataset and can generate via reasoning a more comprehensive description of the data.

Finally, the textual output 22 is provided as an output of the computing system. For example, the textual output 22 can be presented to a user through a graphical user interface or can be used as input for further processing or analysis. The illustrated framework can be used for various applications, such as generating reports or summaries of data, extracting information from complex datasets, or aiding in decision-making processes.

In some implementations, the illustrated framework can be applied to processing graphical depictions of data 14 in the form of charts. A chart can use visual elements such as bars, lines, or pie slices to represent numerical values or relationships between or within datasets. Examples of charts include bar charts, line charts, scatterplots, and pie charts. When presented with a graphical depiction 14 of a chart, the computing system implementing the framework can obtain the input 12 including the chart 14 and processes it using the machine-learned visual-to-language conversion model 16. This model 16 generates a set of text 18 that describes the chart in a more linearized way.

In some implementations, the graphical depiction of the dataset 14 can be or include an image that depicts a plot. A plot is a type of graphical representation of data that displays the relationship between two or more variables. In one example, a plots can show an independent variable on the x-axis and a dependent variable on the y-axis, and use points or lines to show the relationship between them. Plots can be used to visualize patterns, trends, and outliers in the data. In this situation, the computing system again obtains the input 12 including the plot 14 and processes it using the machine-learned visual-to-language conversion model 16, which generates the set of text 18 that describes the plot in a more linearized way.

In some implementations, the set of text 18 descriptive of the dataset can be or include a linearized table. A linear table, also known as a one-dimensional table, is a table that has a single row or column of data elements. It can be represented as a sequence or list of values arranged in a single dimension. Linear tables are often used to represent data in a simple and compact format, and they can be easily processed and analyzed using various algorithms and tools. Linear tables can be used to represent different types of data, such as numerical, textual, or categorical data, and they can be used in various applications, such as databases, spreadsheets, and data analysis tools. These implementations of the present disclosure can be particularly useful in situations where a large amount of data needs to be presented in a concise and easy-to-read format. For example, an analyst might use this method to generate a report summarizing the performance of an entity over a given period.

Referring still to FIG. 1, in some implementations, the input 12 can further include a natural language query 24. In such a case, the set of text 18 descriptive of the dataset can be jointly processed with the natural language query 24 using the machine-learned language model 20 to generate the textual output 22. The textual output 22 can be a textual response that is tailored or responsive to the natural language query. This enables the user to easily retrieve information from the dataset by simply asking a question in natural language.

Some example implementations of the present disclosure can use a machine-learned visual-to-language conversion model 16 that has been trained separately from the machine-learned language model 20. This allows for the optimization of each model's performance in its specific task. The visual-to-language model 16 can specialize in accurately converting graphical depictions of data to text, while the language model 20 can excel in processing and generating language. This separate training also enables the use of an off-the-shelf, general-purpose language model 20.

In some implementations, the machine-learned visual-to-language conversion model 16 can be trained using a set of supervised training data. The training data can include training pairs that include a training graphical depiction of a dataset and a corresponding training textual description. The model 16 can be trained to predict the textual description based on the graphical depiction. This enables the model to learn to accurately convert any new graphical depiction of data to a textual description.

In some implementations, the machine-learned visual-to-language conversion model 16 can be trained using a loss function that measures the relative mapping similarity between predicted tuples and training tuples. Each of the tuples can include a row header, a column header, and a value. This training method can ensure that the model learns to accurately and consistently map the headers and values of the graphical depiction to the corresponding textual description, thereby improving the overall quality of the output.

In some implementations, the machine-learned visual-to-language conversion model 16 can be trained using a set of supervised training data that includes a number of training pairs. Each training pair can include a training graphical depiction of a dataset and training rendering code to render the dataset. The model 16 can be trained to predict the training rendering code based on the graphical depiction, enabling the model to learn to accurately generate rendering code for any new graphical depiction of data.

Some example implementations of the present disclosure can use a machine-learned visual-to-language conversion model 16 that has been trained using a math dataset comprising textual math problem inputs rendered as images. This enables the model to learn to accurately convert images of mathematical equations and/or problems to their corresponding textual descriptions, which can be useful in a wide range of applications, such as the plot-to-table task described herein.

Figure 2:
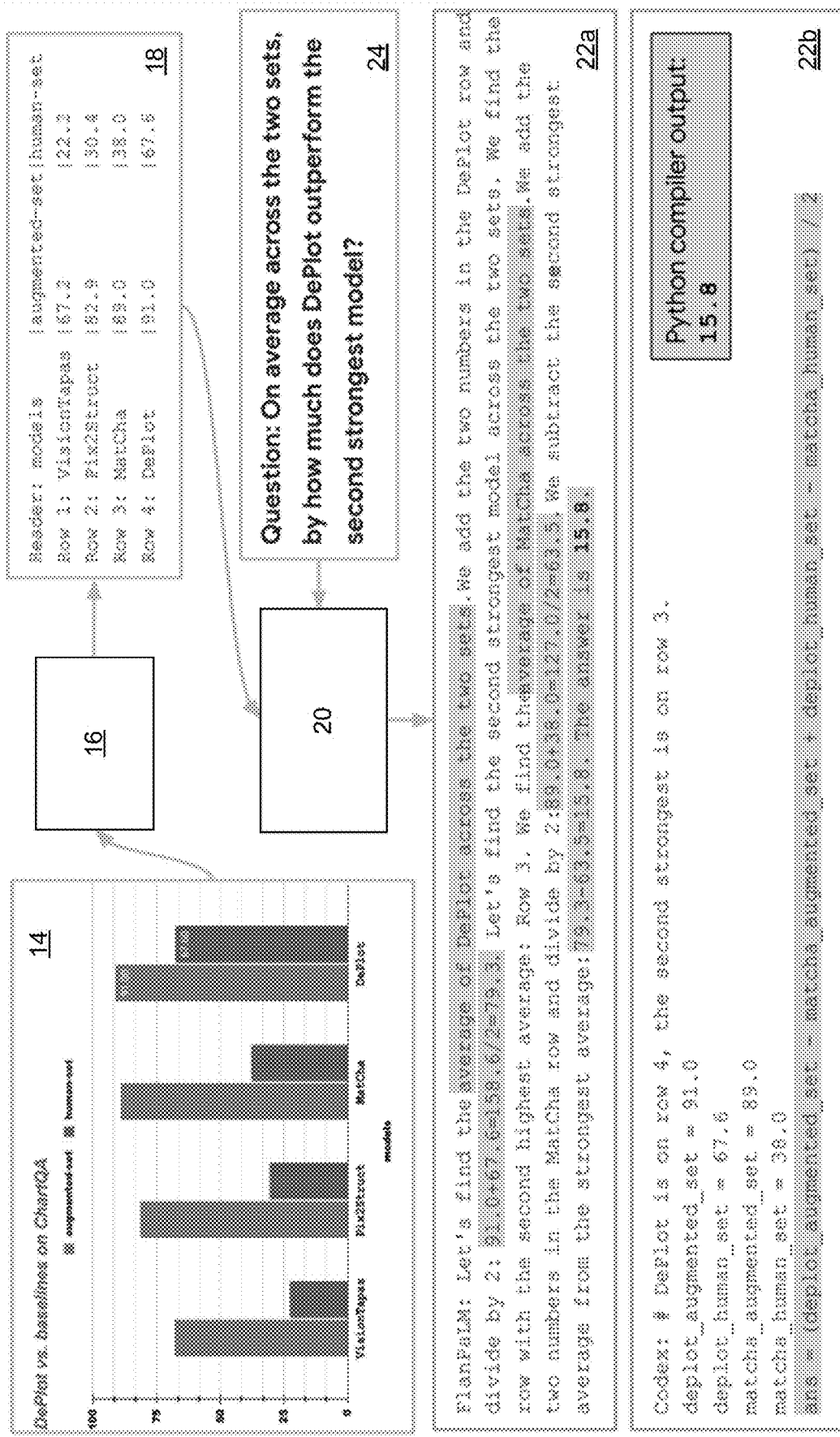
FIG. 2 depicts a block diagram of an example framework for performing visual language reasoning according to example embodiments of the present disclosure.

FIG. 2 shows a specific example application of the example framework shown in FIG. 1. In FIG. 2, a chart 14 is processed with the visual-to language conversion model 16 to generate a textual description 18 of the dataset. The textual description 18 and a query 24 are processed with a language model 20 to generate a textual output (two examples are shown, 22a and 22b, which correspond to the outputs from two different language models 20). Key reasoning steps are highlighted. Output 22a corresponds to the output of FlanPaLM using Chain of Thought prompting. Output 22b corresponds to the output of Codex using Program-of-Thoughts prompting.

Having now described an example implementation of the framework, possible example implementation details are provided.

Example Approaches for Standardizing the Plot-to-Table Task

Accurately performing plot-to-table translation is essential for downstream visual language reasoning tasks. Plot-to-table is also an important task standalone as it addresses IE from plots/charts, which can benefit applications such as automatic reports and documents digitization.

Prior research in table similarity metric is limited. Certain works have introduced a metric based on the graph IE metric, which is denoted herein as "relative number set similarity" or "RNSS" and is now described for context. Let the model predicted numbers in the table be $\mathcal{P}=\{p_i\}_{1 \leq i \leq N}$ and numbers in target tables be $\mathcal{T}=\{t_j\}_{1 \leq j \leq M}$. A pairwise set of relative distances between them can be computed as follows:

$$D(p, t) = \min\left(1, \frac{\|p-t\|}{\|t\|}\right).$$

Then the N×M matrix of distances can be used to find a minimal cost matching between the elements in $\mathcal{P}$ and $\mathcal{T}$, expressed in the form of binary matrix $X \in \mathbb{R}^{N \times M}$. The final score can be computed as $$RNSS = 1 - \frac{\sum_{i=1}^{N}\sum_{j=1}^{M} X_{ij} D(p_i, t_j)}{\max(N, M)}.$$

The metric looks only at the unordered set of numeric entries predicted and measures how the predicted set matches the target set of numbers.

However, RNSS has several key limitations: it does not distinguish the position of numbers within the table; it completely ignores all non numeric content; it gives credit to very high relative errors; and it does not distinguish precision versus recall losses in table reconstruction.

In contrast, the present disclosure proposed that a metric to measure similarity between tables should satisfy the following desiderata:
1. Be invariant to transpositions, as well as permutations of column and rows.
2. Allow but penalize small errors in numeric or textual values up to a certain threshold.
3. Clearly reflect losses in precision or recall.

In order to address all of these requirements the present disclosure proposes the "Relative Mapping Similarity" metric, or "RMS", which views tables not as sets of numbers but as unordered collection of mappings from row and column headers (r, c) to a single value v, which can be written as $$p_i = (p_i^r, p_i^c, p_i^v) \text{ and } t_j = (t_j^r, t_j^c, t_j^v)$$

for each entry in the predicted table $\mathcal{P}=\{p_i\}_{1 \leq i \leq N}$ and the target table $\mathcal{T}=\{t_j\}_{1 \leq j \leq M}$ respectively.

In some implementations, the distance between textual entries can be measured with Normalized Levenshtein Distance, or $NL_\tau$ where the variable $\tau$ is such that values above $\tau$ are set to the maximum of 1 in order to prevent partial credit for very dissimilar texts. Therefore, in some implementations, the distance of two keys $p_i$ and $t_j$ can be measured as $NL_\tau(p^r \| p^c, t^r \| t^c)$ where $\|$ denotes string concatenation.

Likewise, in some implementations, the distance between numeric entries can be computed using relative distance $D_\theta(p, t) = \min(1, \|p-t\|/\|t\|)$ and distances above $\theta$ can be set to the maximum of 1.

Combining this two distances one can compute the similarity between two entries in a mapping $D_{\tau,\theta}(p, t)$ as $(1-NL_\tau$ ($p^r\|p^c$, $t^r\|t^c$))(1−$D_\theta$($p^v$, $t^v$)). When both the keys and values are similar, the similarity $D_{\tau,\theta}$ is close to 1 (close to 0 when dissimilar).

In some implementations, to compute RMS, a computing system can first compute the pairwise similarity between keys in $\mathcal{P}$ and $\mathcal{T}$ using the cost function 1−$NL_\tau$($p^r\|p^c$, $t^r\|t^c$). The computing system can obtain a similarity matrix with shape N×M. With the matrix, the computing system can identify the minimal cost matching $X \in \mathbb{R}^{N \times M}$ between the keys (in the form of a binary matrix). Then, the computing system can compute the precision and recall between two full mappings as the total similarities of the correspondingly matched entries:

$$RMS_{precision} = 1 - \frac{\sum_{i=1}^{N}\sum_{j=1}^{M} X_{ij} D_{\tau,\theta}(p_i, t_j)}{N}, \quad (1)$$

$$RMS_{recall} = 1 - \frac{\sum_{i=1}^{N}\sum_{j=1}^{M} X_{ij} D_{\tau,\theta}(p_i, t_j)}{M}. \quad (2)$$

The $RMS_{F1}$ score can be computed the harmonic mean of the precision and recall. Because permutations of columns and rows yield the same set of column header, row header, value entries, the resulting metric is invariant to them. In order to allow for table transpositions, some example implementations just consider both the table and its transposed version and return the one that corresponds to highest $RMS_{F1}$ score.

Example Approaches for Training Plot-to-table Conversion Models

Unlike prior works that combine rule-based heuristics, OCR systems, and object/keypoint segmentation/detection systems, the present disclosure proposes a visual-to-language conversion model as an end-to-end solution to plot information extraction. The visual-to-language conversion model is conceptually simple yet can robustly work for all types of charts (line, dot, bar, and pie charts) without requiring type-specific engineering and hybrid components.

Specifically, some example implementations can initialize an image-to-text encode-decoder Transformer model. For example, a pre-trained model can be used where the model was pre-trained using some or all of the pre-training tasks described herein. The model can then be finetuned with the task of mapping plots to their underlying data tables.

Figure 3:
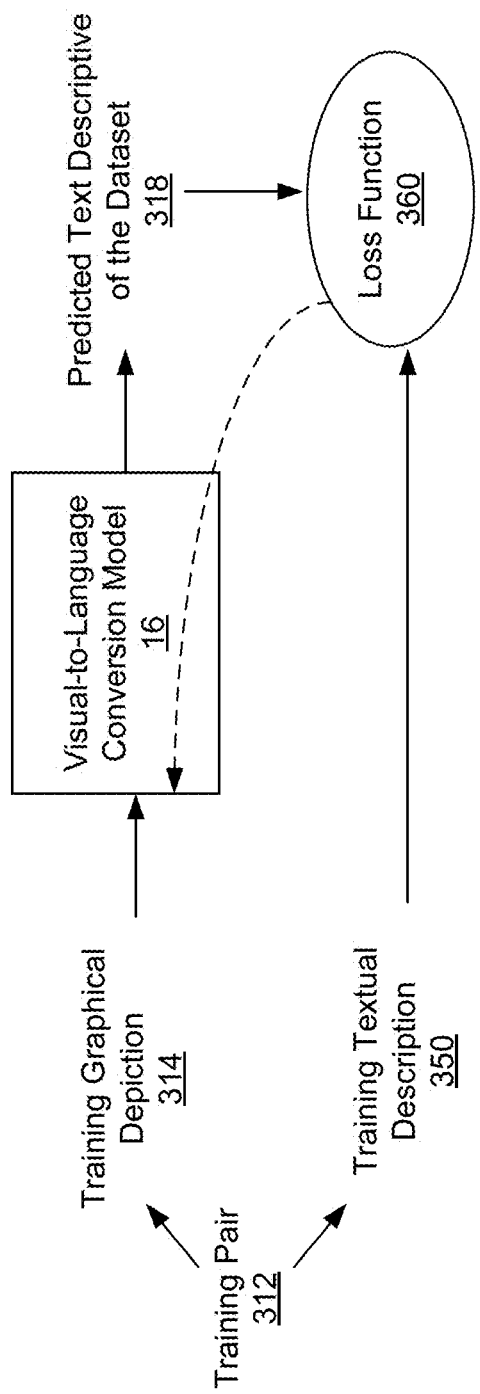
FIG. 3 depicts a block diagram of an example fine-tuning task according to example embodiments of the present disclosure.

As one example, FIG. 3 shows an example training (e.g., finetuning) approach for the visual-to-language conversion model 16. As illustrated in FIG. 3, training the visual-to-language conversion model 16 can include obtaining a set of training pairs 312, each consisting of a graphical depiction of a dataset 314 and a corresponding textual description of the dataset 350. These training pairs can be used to train the visual-to-language conversion model 16 to predict the textual description of a dataset given its graphical depiction. In order to do this, the model 16 processes the training graphical depiction 314 with the visual-to-language conversion model 16 to generate a predicted textual description of the dataset 318.

To assess the accuracy of the predicted textual description 318, a loss function 360 is evaluated that compares the predicted textual description 318 generated by the model 16 and the actual textual description 350 provided in the training pair 312. The loss function 360 measures the difference between the predicted output 318 and the actual output 350, and the goal of training is to minimize this difference.

In some implementations, the training textual description 350 and the predicted text description 318 can be tables. For example, the tables can be linearized as a textual sequence (e.g., markdown format) with |separating cells and \n separating rows. The visual-to-language conversion model 16 can be trained to generate the table from left to right autoregressively.

In one example, the loss function 360 can be the Relative Mapping Similarity (RMS) metric. The RMS metric considers tables not as sets of numbers, but rather as unordered collections of mappings from row and column headers (r, c) to a single value v. The RMS metric can evaluate the similarity between a predicted table 318 and a target table 350 based on the relative mappings of each table. This allows for a more flexible comparison between the two tables, as it does not require them to have the same order or structure. By evaluating the loss function 360 using the RMS metric, the model 16 can be updated based on the similarity between the predicted table 318 and the target table 350, resulting in more accurate predictions in the future.

Referring still to FIG. 3, based on the loss function evaluation, the model is updated to improve its ability to predict the textual description of a dataset given its graphical depiction. This iterative process of obtaining training pairs, processing the training graphical depictions with the visual-to-language conversion model, evaluating a loss function, and updating the model continues until the model is able to accurately predict the textual description of a dataset given its graphical depiction.

To provide a specific example, in some implementations, the training pairs 312 can be a set of parallel plot-table pairs. For example, both synthetic data and real world plot-table pairs can be combined to form a finetuning corpus.

Example Approaches for Prompting LLMs

With the visual-to-language model described herein, a given graphical depiction of data can be converted into its textual form (e.g., as a linearized table). Textual prompts can then be constructed by combining (e.g., concatenating) the textual content and instructional queries (e.g., questions for QA tasks). Some example implementations can prepend a one-shot example before the prompt for current example.

In some implementations, the full prompt for the QA task can use Chain-of-Thoughts (CoT). In addition or alternatively to CoT prompting, self-consistency (SC) prompting can be used, which samples a diverse set of reasoning paths instead and choose the majority-voted answer instead of relying on one greedily-decoded answer as in CoT. Other implementations can take advantage of alternative language models such as, for example, fine-tuned tabular QA models or use LLMs that generate python code or SQL programs.

Example Pre-Training Techniques

The present disclosure proposes that layout understanding and basic math operation capabilities are important elements for performing visual language understanding/reasoning. Therefore, some example implementations can inject such capabilities to the model by performing two pretraining tasks: chart derendering and math reasoning, which we described in further detail in the following subsections.

In some implementations, the proposed pretraining techniques can be performed on a model that has already been instantiated and, potentially, pretrained using other pretraining techniques. One example starting model checkpoint may be the Pix2Struct model, a recently proposed image-to-text visual language model, described in Lee et al., Pix2Struct: Screenshot Parsing as Pretraining for Visual Language Understanding. arXiv: 2210.03347 [cs.CL]

Example Chart Derendering Pre-Training

Plots and charts are usually generated by an underlying data table and a piece of rendering code. The rendering code decides the overall layout of the figure (e.g., type, direction, color/shape scheme of the chart) and the underlying data table decides the actual numbers and the groupings of them. Both the data and rendering code are sent to a compiler/rendering engine to create the final graphical image. To understand a chart one needs to discover the visual patterns in the image, effectively parse and group them to extract the key information. Reversing the plot rendering process demands all such capabilities and can thus serve as a perfect pretraining task.

In practice, it is challenging to simultaneously obtain charts, their underlying data tables, and their rendering code. To collect sufficient pretraining data, the following pairs can be accumulated: (chart, code) and (chart, table) pairs. For (chart, code), publicly available code sets can be crawled and blocks with figures can be extracted. A figure and the code block right before it can be saved as a (chart, code) pair.

For (chart, table) pairs, two example sources are as follows: One is to manually write code for converting web-crawled tables to charts. Several plotting options can be randomly combined. The random variables can include: using either matplotlib or seaborn as the plotting package; using either bar, line, or pie chart; styles and colors of the charts; whether to show numbers explicitly on the graph; font and size of the texts. Besides synthetic data, another example source is to add chart-table pairs from other datasets. A second example source is web-crawled chart-table pairs.

Figure 4:
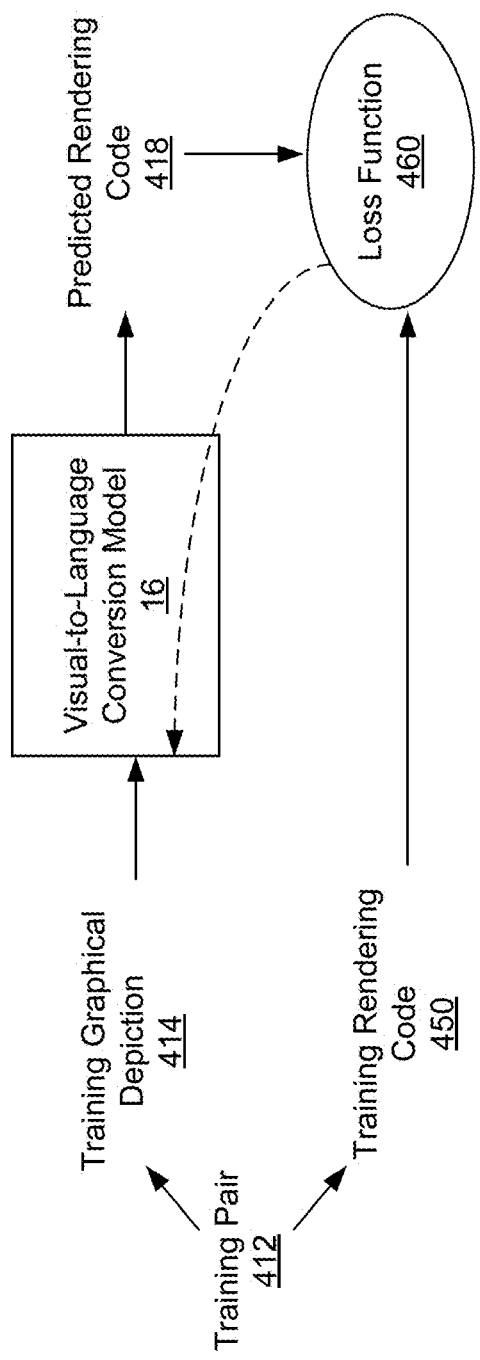
FIG. 4 depicts a block diagram of an example chart de-rendering pre-training task according to example embodiments of the present disclosure.

FIG. 4 shows one example of the chart derendering pretraining task. As illustrated in FIG. 4, the process begins by obtaining a training pair 412 that includes a training graphical depiction of a dataset 414 and a set of training rendering code 540. The training rendering code 540 is programming language code that, when executed, causes rendering of the training graphical depiction 414. Then, the training graphical depiction 414 is processed with a visual-to-language conversion model 16 to generate a predicted rendering code 418. This predicted rendering code 418 is evaluated against the training rendering code 450 using a loss function 460. In this case, the loss function 460 measures the difference between the predicted code 418 and actual rendering code 450. This comparison enables the model 16 to learn and improve by updating its parameters to minimize the loss function 460. The update process can include adjusting the model's weights to improve its accuracy in predicting rendering code.

Example Math Reasoning Pre-Training

Reasoning over visual language can include (1) effective recognition and grouping of the visual elements and also (2) applying mathematical operations (such as sorting, min/max, etc.) on top of them. Plot derendering addresses (1) but does not directly address (2) in the current pretraining framework. As a result, some example implementations can explicitly inject numerical reasoning knowledge to the image-to-text model by learning math reasoning skills from textual math datasets.

Two existing textual math reasoning datasets that can be used are, MATH and DROP for pretraining. MATH is synthetically created, containing two million training examples per type of questions. DROP is a reading-comprehension-style QA dataset where the input is a paragraph context and a question. DROP has 96k question and answer pairs over 6.7K paragraphs. To solve questions in DROP, the model needs to read the paragraph, extract relevant numbers and perform numerical computation to predict the answer. Both datasets were found to be complementarily helpful. MATH contains large amounts of questions and is categorized which helps identify math operations needed to explicitly inject to the model. DROP's reading-comprehension format resembles the typical QA format where models need to simultaneously perform information extraction and reasoning.

In practice, some example implementations can render the textual inputs of both datasets into images (concatenating the context and question for DROP) and send to the visual-to-language model. The visual-to-language model is trained to decode the answer.

Figure 5:
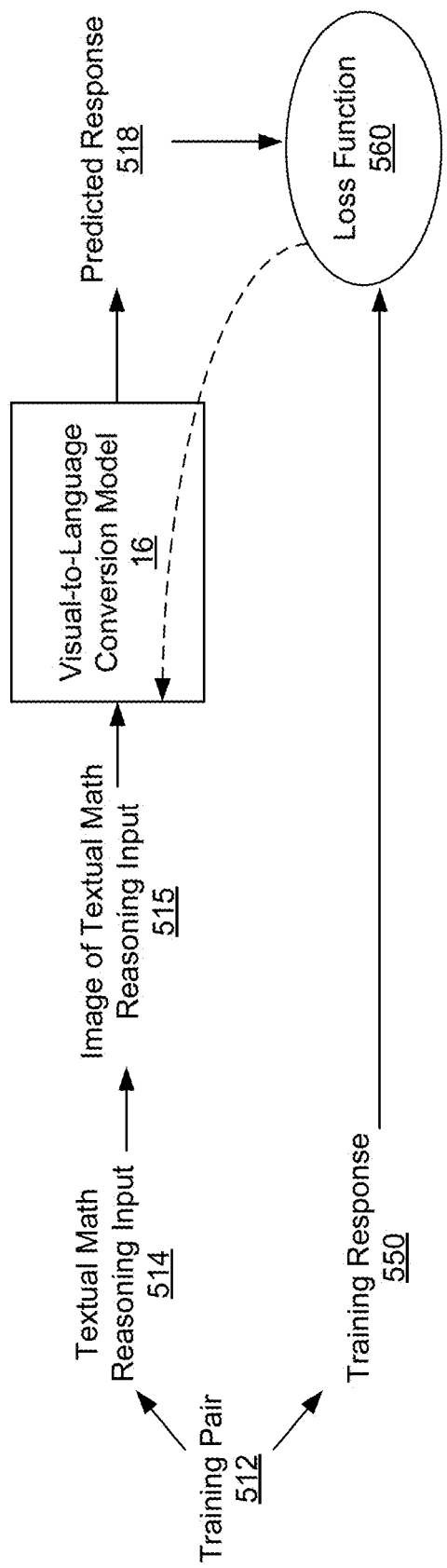
FIG. 5 depicts a block diagram of an example math reasoning pre-training task according to example embodiments of the present disclosure.

FIG. 5 illustrates an example implementation of the math reasoning pre-training task. As illustrated in FIG. 5, the process involves training a visual-to-language model 16 to understand and generate responses to textual math reasoning inputs rendered as images. In a first step, training pairs 512 that include a textual math reasoning input 514 and a corresponding training response 550 are obtained. Next, the textual math reasoning input 514 is rendered as an image 515 to be processed by the visual-to-language model 16. The model 16 then generates a predicted response 518 based on the input image 515.

Once the predicted response 518 is generated, a loss function 560 is used to evaluate how well the model 16 performed. This function 560 compares the predicted response 518 with the actual training response 550 to determine the difference between the two. The loss function 560 is designed to measure the discrepancy between the predicted response 518 and the actual response 550.

Finally, the model 16 is updated based on the loss function 560. This can include adjusting the weights and parameters of the model 16 to improve its performance on future inputs. By iteratively repeating this process, the model 16 can learn to generate accurate responses to a wide range of textual math reasoning inputs rendered as images.

Additionally, besides the two newly proposed pretraining strategies, some example implementations can also apply other pretraining techniques such as a screenshot parsing task. Specifically, given screenshot of a website, parts of the website is masked, and the visual-to-language model needs to predict the underlying simplified HTML code that could render the original unmasked website screenshot. A final pretraining task can be a mixture of all aforementioned tasks.

Example Methods

Figure 6:
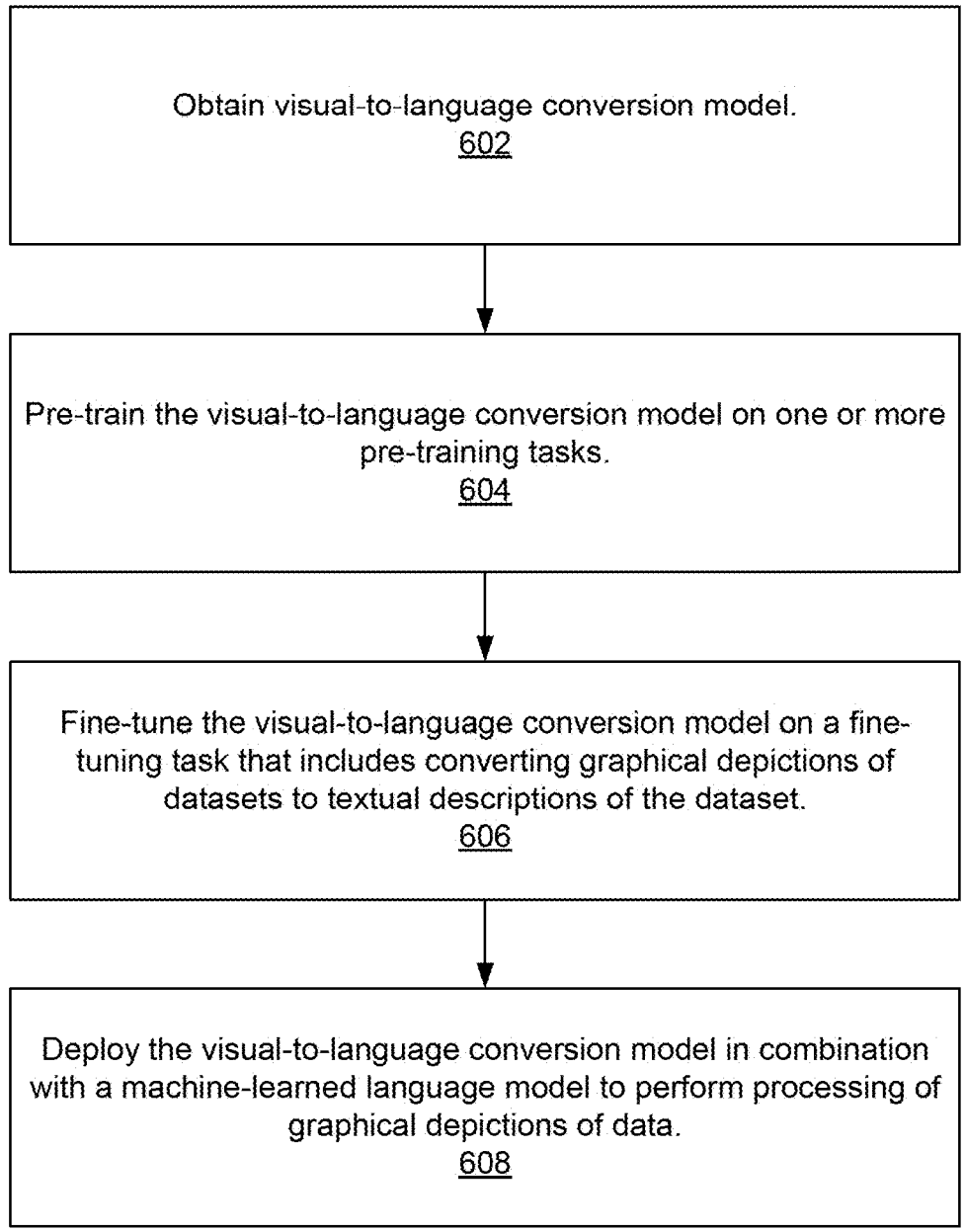
FIG. 6 depicts a flow chart diagram of an example method to train and use a visual-to-language model according to example embodiments of the present disclosure.

FIG. 6 depicts a flow chart diagram of an example method to train and use a visual-to-language conversion model according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a visual-to-language conversion model is obtained. As examples, this step can include selecting a deep neural network architecture, such as a convolutional neural network (CNN) or Transformer network, and specifying the number of layers and number of nodes in each layer. In some implementations, a pretrained model can be obtained at 602. An example starting model checkpoint may be the Pix2Struct model, a recently proposed image-to-text visual language model, described in Lee et al., Pix2Struct: Screenshot Parsing as Pretraining for Visual Language Understanding. arXiv: 2210.03347 [cs.CL]

At 604, the visual-to-language conversion model is pre-trained on one or more pre-training tasks. As examples, this step can include selecting pre-training tasks that utilize the model's ability to extract features from images, such as image classification, object detection, or image captioning. The pre-training dataset could include a large set of images, such as ImageNet or COCO, and the model could be trained to predict labels or captions for each image.

In some implementations, at 604, the pre-training can include performing a pre-training task that involves chart de-rendering. The chart de-rendering task can involve converting a graphical depiction of a dataset into a corresponding set of rendering code that, when executed, causes rendering of the graphical depiction of the dataset. This task can be used to train the visual-to-language conversion model to understand the underlying structure of graphical depictions of data, and to rendering code descriptions that accurately capture this structure.

In some implementations, at 604, the pre-training can include performing a pre-training task that involves math reasoning. This task can involve processing a variety of math problems, such as arithmetic, algebra, and calculus, and generating natural language descriptions of the solutions. The visual-to-language conversion model can be trained to recognize the underlying structure of these problems and to generate accurate and concise natural language descriptions that convey the key ideas and concepts involved.

In particular, in some implementations, a math reasoning task can involves processing a textual math reasoning input that has been rendered as an image. This can involve recognizing the mathematical symbols and equations in the image, and then generating a natural language description of the problem and its solution. The visual-to-language conversion model can be trained on a variety of different types of math problems, including problems that involve multiple steps and complex calculations, in order to improve its accuracy and reliability in processing math reasoning inputs.

At 606, after pre-training, the visual-to-language conversion model is fine-tuned on a fine-tuning task. As an example, the fine-tuning task can include converting a graphical depiction of a dataset to a textual description of the dataset. Example technical details that can be used in this step include selecting a dataset that contains graphical depictions of tables, and the corresponding textual descriptions of the tables. The model can be fine-tuned using a loss function that measures the similarity between the predicted textual descriptions and the ground truth textual descriptions. The fine-tuning can be performed using gradient descent optimization with a specified learning rate and number of epochs.

At 608, after fine-tuning, the visual-to-language conversion model is deployed in combination with a machine-learned language model to perform processing of graphical depictions of data. Example technical details that can be performed in this step include selecting a language model, such as a large language model, and integrating the visual-to-language conversion model as the input layer of the language model. The combined model can optionally be jointly trained on a large dataset of textual descriptions of tables, or the models could not be trained further together.

The combined models can be deployed on a computer system or a cloud-based platform for use in a variety of applications, such as data analysis or natural language querying of tables. More generally, the model could be applied to various use cases, such as data analysis, where it could help in understanding and interpreting data represented in graphical form, and natural language querying of tables, where users can ask questions about the data in a more natural way, as opposed to having to manually extract the information from tables. By using the model in such applications, users could potentially save time and improve the accuracy of their analysis, as well as reduce errors and improve accessibility for individuals who may struggle with interpreting visual data.

Example Devices and Systems

Figure 7A:
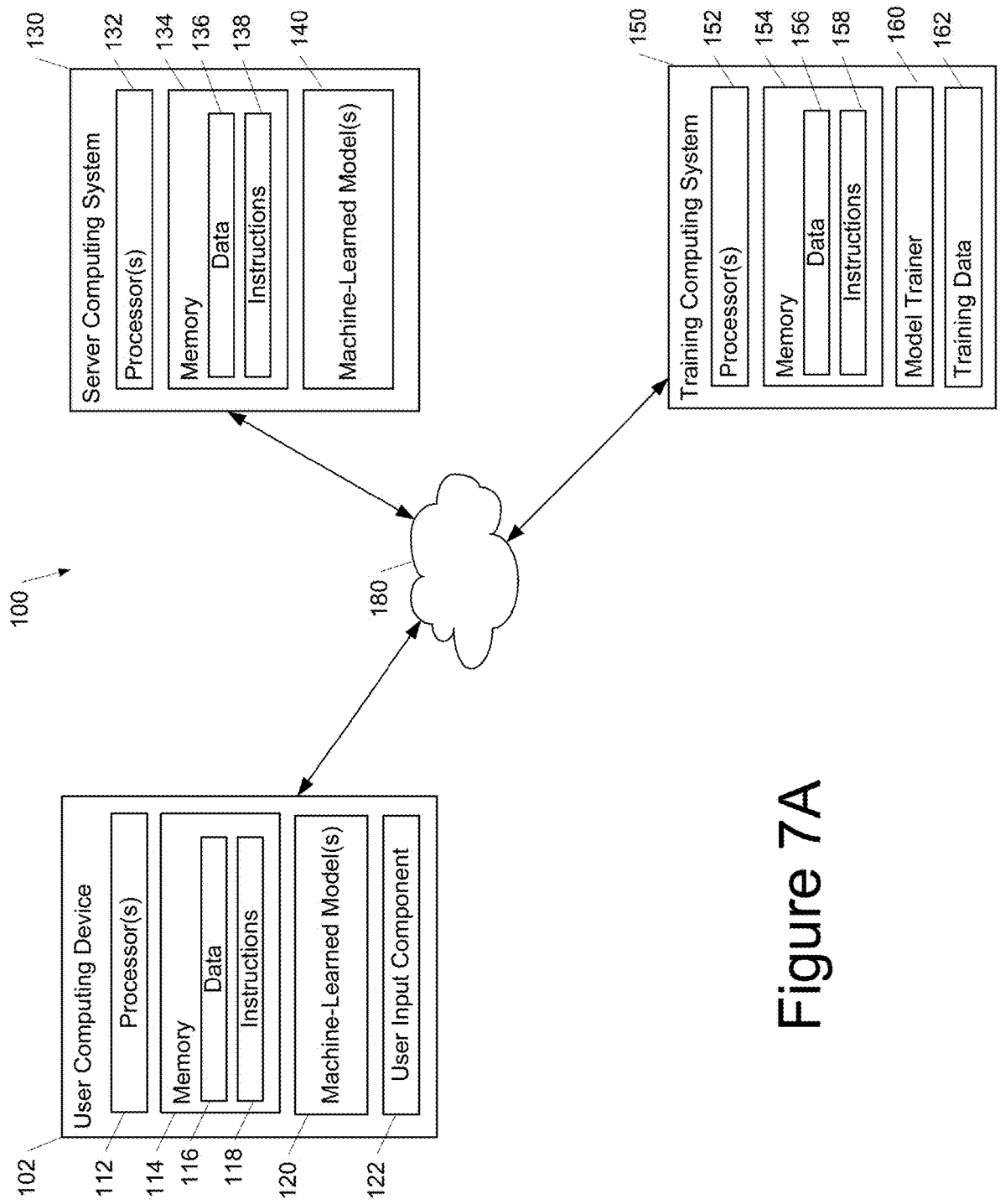
FIG. 7A depicts a block diagram of an example computing system according to example embodiments of the present disclosure.

FIG. 7A depicts a block diagram of an example computing system 100 that according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIGS. 1-6.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel visual language reasoning across multiple instances of inputs).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a visual language reasoning service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 1-6.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 7A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 7B:
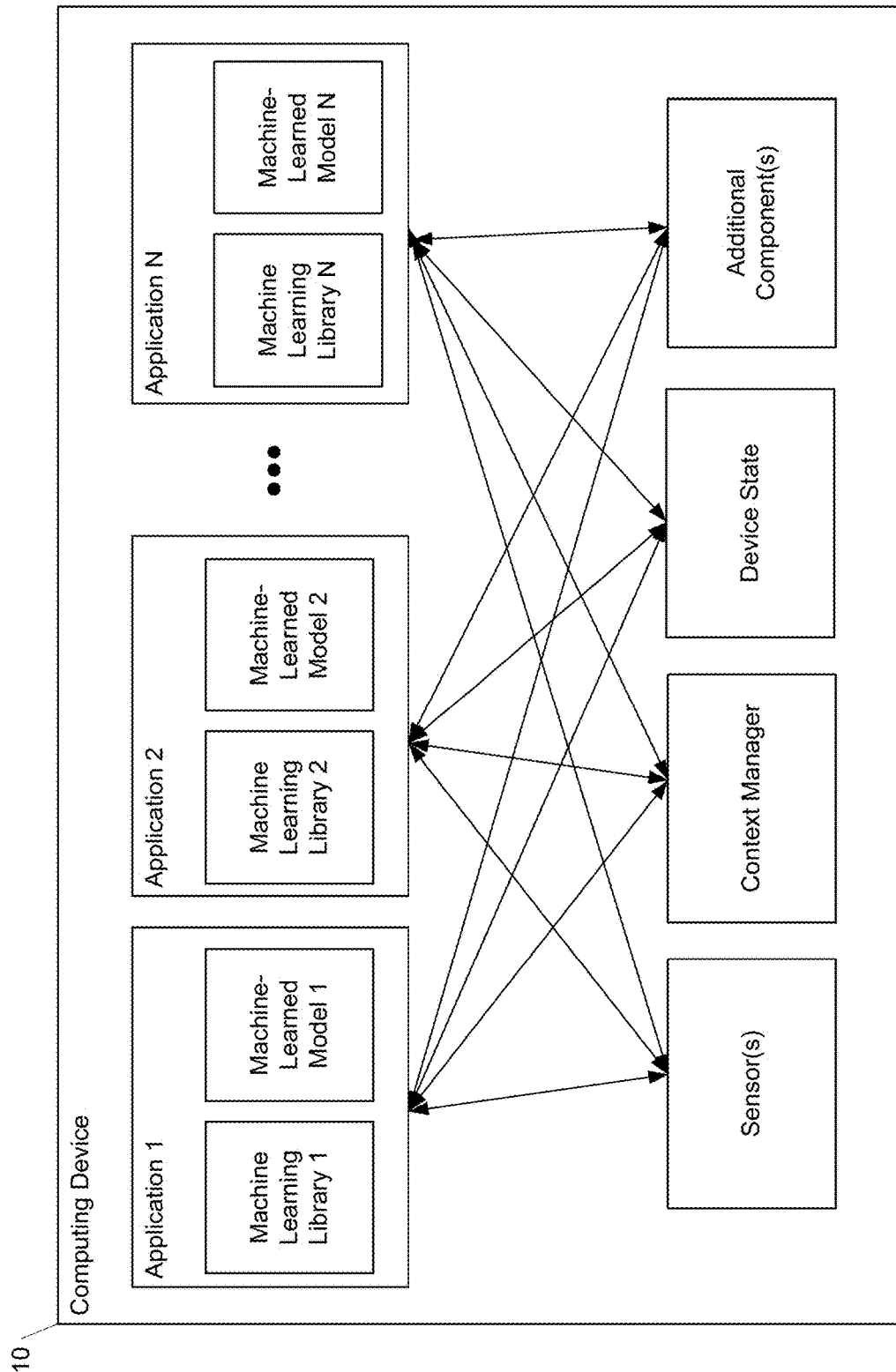
FIG. 7B depicts a block diagram of an example computing device according to example embodiments of the present disclosure.

FIG. 7B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 7B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 7C:
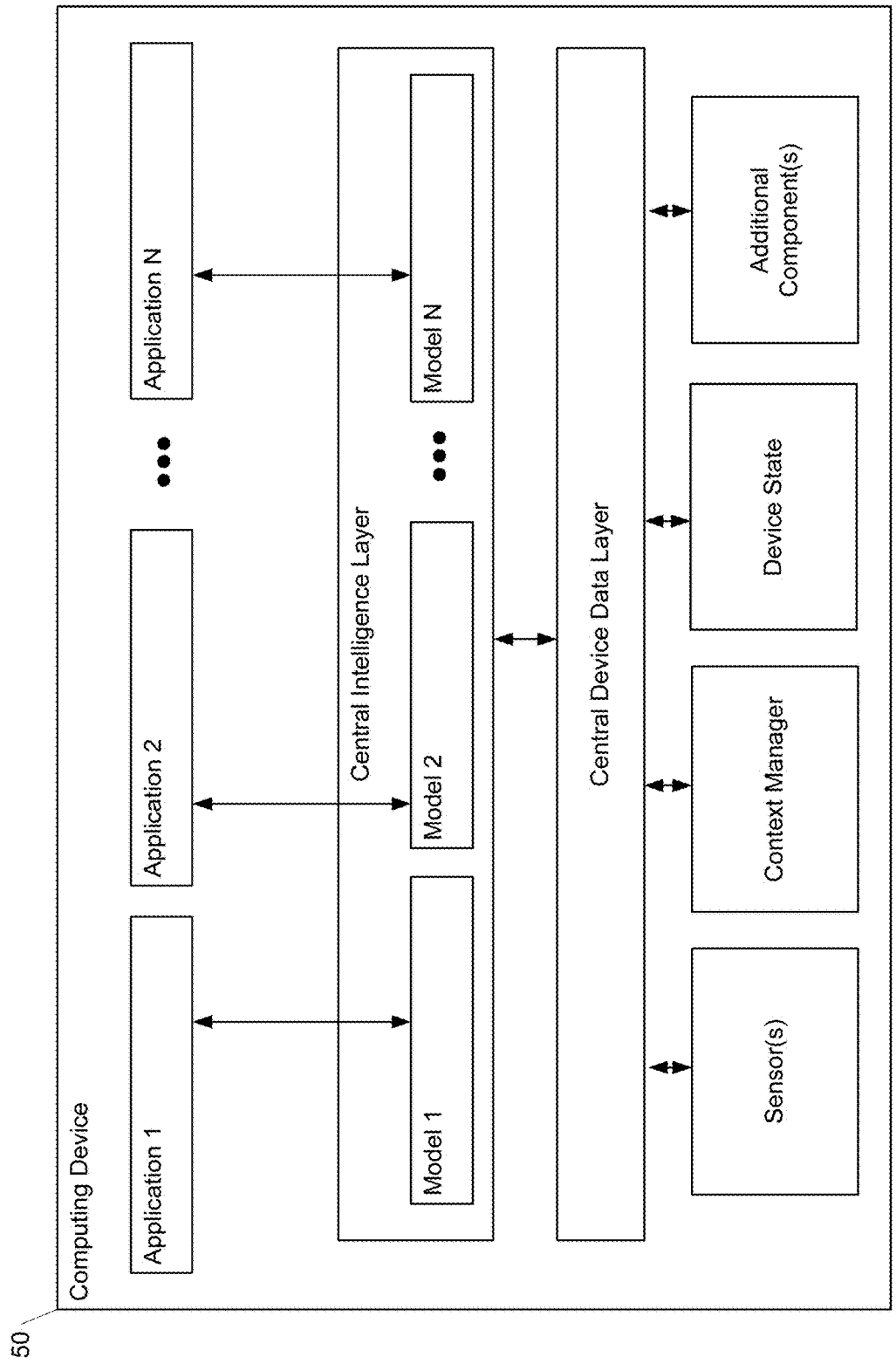
FIG. 7C depicts a block diagram of an example computing device according to example embodiments of the present disclosure.

FIG. 7C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 7C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 7C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to process graphical depictions of data, the method comprising:
    obtaining, by a computing system comprising one or more computing devices, an input comprising a graphical depiction of a dataset;
    processing, by the computing system, the graphical depiction of the dataset with a machine-learned visual-to-language conversion model to generate, as an output of the machine-learned visual-to-language conversion model a set of text descriptive of the dataset, the machine-learned visual-to-language conversion model trained using a loss function that measures a relative mapping similarity, the relative mapping similarity comprising a similarity between predicted headers and training headers;
    processing, by the computing system, the set of text descriptive of the dataset with a machine-learned language model to generate, as an output of the machine-learned language model, a textual output; and
    providing, by the computing system, the textual output as an output.

2. The computer-implemented method of claim 1, wherein the graphical depiction of the dataset comprises an image that depicts a chart.

3. The computer-implemented method of claim 1, wherein the graphical depiction of the dataset comprises an image that depicts a plot.

4. The computer-implemented method of claim 1, wherein the set of text descriptive of the dataset comprises a linearized table.

5. The computer-implemented method of claim 1, wherein:
the input further comprises a natural language query;
processing, by the computing system, the set of text descriptive of the dataset with the machine-learned language model comprises jointly processing, by the computing system, the set of text descriptive of the dataset and the natural language query with the machine-learned language model to generate, as the output of the machine-learned language model, the textual output; and
the textual output comprises a textual response that is responsive to the natural language query.

6. The computer-implemented method of claim 1, wherein the machine-learned visual-to-language conversion model has been trained separately from the machine-learned language model.

7. The computer-implemented method of claim 1, wherein:
the machine-learned visual-to-language conversion model has been trained using a set of supervised training data comprising a plurality of training pairs, each training pair comprising a training graphical depiction of a dataset and a training textual description of the dataset; and
the machine-learned visual-to-language conversion model has been trained to predict the training textual description of the dataset.

8. The computer-implemented method of claim 7, wherein the loss function measures the relative mapping similarity between predicted tuples and training tuples, wherein each of the predicted tuples and training tuples comprises a row header, a column header, and a value.

9. The computer-implemented method of claim 1, wherein:
the machine-learned visual-to-language conversion model has been trained using a set of supervised training data comprising a plurality of training pairs, each training pair comprising a training graphical depiction of a dataset and training rendering code, wherein the training rendering code comprises rendering code to render the training graphical depiction of a dataset; and
the machine-learned visual-to-language conversion model has been trained to predict the training rendering code.

10. The computer-implemented method of claim 1, wherein the machine-learned visual-to-language conversion model has been trained using a math dataset comprising textual math problem inputs rendered as images.

11. A computing system configured to process graphical depictions of data, the computing system comprising:
one or more processors; and
one or more non-transitory computer-readable media that collectively store:
a machine-learned visual-to-language conversion model configured to convert graphical depictions of data to textual descriptions;
a machine-learned language model configured to process textual input to generate textual output; and
instructions that, when executed by the computing system, cause the computing system to perform operations, the operations comprising:
obtaining, by the computing system, an input comprising a graphical depiction of a dataset;
processing, by the computing system, the graphical depiction of the dataset with a machine-learned visual-to-language conversion model to generate, as an output of the machine-learned visual-to-language conversion model a set of text descriptive of the dataset, the machine-learned visual-to-language conversion model trained using a loss function that measures a relative mapping similarity between predicted headers and training headers; and
processing, by the computing system, the set of text descriptive of the dataset with a machine-learned language model to generate, as an output of the machine-learned language model, a textual output.

12. The computing system of claim 11, wherein the graphical depiction of the dataset comprises an image that depicts a chart.

13. The computing system of claim 11, wherein the graphical depiction of the dataset comprises an image that depicts a plot.

14. The computing system of claim 11, wherein the set of text descriptive of the dataset comprises a linearized table.

15. The computing system of claim 11, wherein:
the input further comprises a natural language query;
processing, by the computing system, the set of text descriptive of the dataset with the machine-learned language model comprises jointly processing, by the computing system, the set of text descriptive of the dataset and the natural language query with the machine-learned language model to generate, as the output of the machine-learned language model, the textual output; and
the textual output comprises a textual response that is responsive to the natural language query.

16. One or more non-transitory computer-readable media that collectively store instructions that, when executed by a computing system, cause the computing system to perform operations, the operations comprising:
obtaining a visual-to-language conversion model;
pre-training the visual-to-language conversion model using one or more pre-training tasks wherein at least one pre-training task of the one or more pre-training tasks comprises a math reasoning task;
after said pre-training, fine-tuning the visual-to-language conversion model on a fine-tuning task, wherein the fine-tuning task comprises converting a graphical depiction of a dataset to a textual description of the dataset; and
after said fine-tuning, deploying the visual-to-language conversion model in combination with a machine-learned language model to perform processing of graphical depictions of data wherein processing the graphical depictions of data comprise rendering a text-based numerical reasoning input as an image and decoding an answer.

17. The one or more non-transitory computer-readable media of claim 16, wherein another pre-training task of the one or more pre-training tasks comprises a chart de-rendering task.

18. The one or more non-transitory computer-readable media of claim 17, wherein the chart de-rendering task comprises converting a graphical depiction of a dataset to rendering code that, when executed, causes rendering of the graphical depiction of the dataset.

19. The one or more non-transitory computer-readable media of claim 16, wherein the math reasoning task comprises processing a textual math reasoning input that has been rendered as an image.

* * * * *